US012748741B2

(12) United States Patent
Kang et al.

(10) Patent No.: US 12,748,741 B2
(45) Date of Patent: Sep. 29, 2026

(54) INFORMATION PROCESSING METHOD AND APPARATUS, DEVICE, AND STORAGE MEDIUM

(71) Applicants: INSTITUTE OF COMPUTING TECHNOLOGY, CHINESE ACADEMY OF SCIENCES, Beijing (CN); Beijing Volcano Engine Technology Co., Ltd., Beijing (CN)

(72) Inventors: Qihan Kang, Beijing (CN); Ziwei Xiong, Beijing (CN); Mi Zhang, Beijing (CN); Dejun Jiang, Beijing (CN); Jin Xiong, Beijing (CN); Jiaxin Ou, Beijing (CN); Yi Wang, Beijing (CN)

(73) Assignees: INSTITUTE OF COMPUTING TECHNOLOGY, CHINESE ACADEMY OF SCIENCES;, Beijing (CN); BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 102 days.

(21) Appl. No.: 18/793,745

(22) Filed: Aug. 2, 2024

(65) Prior Publication Data

US 2025/0124012 A1 Apr. 17, 2025

(30) Foreign Application Priority Data

Oct. 12, 2023 (CN) ........................ 202311322341.6

(51) Int. Cl.
*G06F 16/22* (2019.01)
*G06F 16/27* (2019.01)

(52) U.S. Cl.
CPC ........ *G06F 16/2246* (2019.01); *G06F 16/278* (2019.01)

(58) Field of Classification Search
CPC ........................... G06F 16/2246; G06F 16/278
(Continued)

(56) References Cited

U.S. PATENT DOCUMENTS 12,450,229 B1 * 10/2025 Gordon ............... G06F 16/2471
2014/0095775 A1 4/2014 Talagala et al.
(Continued)

FOREIGN PATENT DOCUMENTS

CN 115357600 A 11/2022
CN 116107513 A 5/2023
(Continued)

OTHER PUBLICATIONS

China Patent Application No. 202311322341.6; Registration Notification; dated Sep. 15, 2025; 10 pages.
(Continued)

*Primary Examiner* — Giovanna B Colan
(74) *Attorney, Agent, or Firm* — BakerHostetler

(57) ABSTRACT

The embodiments of the present disclosure provide an information processing method, an information processing apparatus, an electronic device, and a storage medium. The method is applied to a key-value storage system for key-value separation, a storage unit in the key-value storage system includes a key partition used for storing LSMT information and a plurality of storage partitions used for storing key-value information, and the method includes: selecting, according to the LSMT information in the key partition, a target storage partition with a highest invalid information rate from the storage partitions; detecting validity information corresponding to each key-value information in the target storage partition, and screening out valid key-value information according to the validity information corresponding to each key-value information; and transferring and storing the valid key-value information to a first
(Continued)

storage partition except for the target storage partition, and erasing multiple key-value information stored in the target storage partition.

20 Claims, 3 Drawing Sheets

(58) Field of Classification Search
USPC .......................................................... 707/741
See application file for complete search history.

(56) References Cited

U.S. PATENT DOCUMENTS

| | | | | |
|---|---|---|---|---|
| 2017/0212680 | A1 * | 7/2017 | Waghulde | G06F 3/061 |
| 2020/0117728 | A1 * | 4/2020 | Tomlinson | G06F 16/2246 |
| 2020/0142868 | A1 * | 5/2020 | Varadarajan | G06F 16/278 |
| 2021/0216517 | A1 * | 7/2021 | Graefe | G06F 16/2246 |

FOREIGN PATENT DOCUMENTS

| | | | | | |
|---|---|---|---|---|---|
| CN | 116450656 | A | | 7/2023 | |
| CN | 118276775 | A | * | 7/2024 | G06F 3/0652 |

OTHER PUBLICATIONS

Yu Yang et al.; "Optimization of LSM-tree storage systems based on non-volatile memory"; Journal of East China Normal University (Nat'l Science); No. 5; Sep. 2021; p. 37-47 (contains English Abstract).
Hyeongjun Jeon et al.; "MemTable LSM Performance Improvement of LSM-tree Using Partial Flushing of MemTable"; Journal of KIISE; vol. 50 No. 1; 2023; p. 87-93 (contains English Abstract).

* cited by examiner

INFORMATION PROCESSING METHOD AND APPARATUS, DEVICE, AND STORAGE MEDIUM

CROSS-REFERENCE TO RELATED APPLICATION

This application claims the priority to and benefits of the Chinese Patent Application No. 202311322341.6, filed on Oct. 12, 2023, the entire disclosure of which is incorporated herein by reference as part of the disclosure of this application.

TECHNICAL FIELD

Embodiments of the present disclosure relate to the technical field of the Internet, in particular to an information processing method, an information processing apparatus, an electronic device, and a storage medium.

BACKGROUND

At present, the key-value storage system based on the log-structured merge tree (LSMT) can receive key-value records corresponding to write operations through a memory table (e.g., MemTable). When the size of MemTable reaches a certain threshold, it will store key-value records in a storage unit (e.g., a hard disk drive or a solid state disk) of the key-value storage system in the form of a sorted string table (SST). However, with the updating of the key-value records, the number of invalid key-value records accumulated in the SST file is increasing, and accordingly, it needs to perform garbage collection processing on the invalid key-value records in the SST file.

However, in the process of subjecting the SST file to the garbage collection processing by a processing method in the related art, write operations of key-value records are increased, resulting in write amplification of the key-value storage system, and thus the efficiency of the information processing method in the related art is relatively low.

SUMMARY

The embodiments of the present disclosure provide an information processing method, an information processing apparatus, an electronic device, and a storage medium, which can improve the efficiency of the information processing method.

In a first aspect, the embodiments of the present disclosure provide an information processing method, applied to a key-value storage system for key-value separation, a storage unit in the key-value storage system comprises a key partition and a plurality of storage partitions, the key partition is used for storing log-structured merge tree (LSMT) information, the plurality of storage partitions are used for storing key-value information, and the method comprises:

- selecting, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;
- detecting validity information corresponding to each key-value information in the target storage partition, and screening out valid key-value information from multiple key-value information stored in the target storage partition according to the validity information corresponding to each key-value information, wherein the validity information comprises being valid or being invalid; and
- transferring and storing the valid key-value information to a first storage partition except for the target storage partition, and erasing the multiple key-value information stored in the target storage partition.

In a second aspect, the embodiments of the present disclosure provide an information processing apparatus, applied to a key-value storage system for key-value separation, a storage unit in the key-value storage system comprises a key partition and a plurality of storage partitions, the key partition is used for storing log-structured merge tree (LSMT) information, the plurality of storage partitions are used for storing key-value information, and the apparatus comprises:

- a selecting module, configured to select, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;
- a screening module, configured to detect validity information corresponding to each key-value information in the target storage partition, and screen out valid key-value information from multiple key-value information stored in the target storage partition according to the validity information corresponding to each key-value information, wherein the validity information comprises being valid or being invalid; and
- a processing module, configured to transfer and store the valid key-value information to a first storage partition except for the target storage partition, and erase the multiple key-value information stored in the target storage partition.

In a third aspect, the embodiments of the present disclosure provide an electronic device, the electronic device comprises a processor and a memory in communication connection with the processor, the memory stores computer-executable instructions, and the computer-executable instructions, when executed by the processor, cause the processor to implement the information processing method according to the first aspect.

In a fourth aspect, the embodiments of the present disclosure provide a computer-readable storage medium, computer-executable instructions are stored on the computer-readable storage medium, and the computer-executable instructions, when executed by a processor, cause the processor to implement the information processing method according to the first aspect.

In a fifth aspect, the embodiments of the present disclosure provide a computer program product, the computer program product comprises a computer program, and the computer program, when executed by a processor, causes the processor to implement the information processing method according to the first aspect.

In the embodiments of the present disclosure, according to the LSMT information, the target storage partition with the highest invalid information rate is selected from the plurality of storage partitions included in the storage unit, the key-value information in the target storage partition is processed, a garbage collection granularity of the LSMT information is aligned with a garbage collection granularity of the storage partition, and while the LSMT information is subjected to garbage collection processing, the storage partition is also subjected to garbage collection processing. Compared with a recycling method alone, the times of garbage collection is reduced and the write amplification of the key-value information is reduced, thus improving the data processing efficiency.

BRIEF DESCRIPTION OF DRAWINGS

In order to more clearly illustrate the technical solutions of the embodiments of the present disclosure or technical solutions in the related art, the drawings that need to be used in description of the embodiments or related art will be briefly introduced in the following. It is obvious that the drawings described below are only related to some embodiments of the present disclosure, and for those skilled in the art, other drawings can be obtained based on these accompanying drawings without inventive efforts.

DETAILED DESCRIPTION

Figure 1:
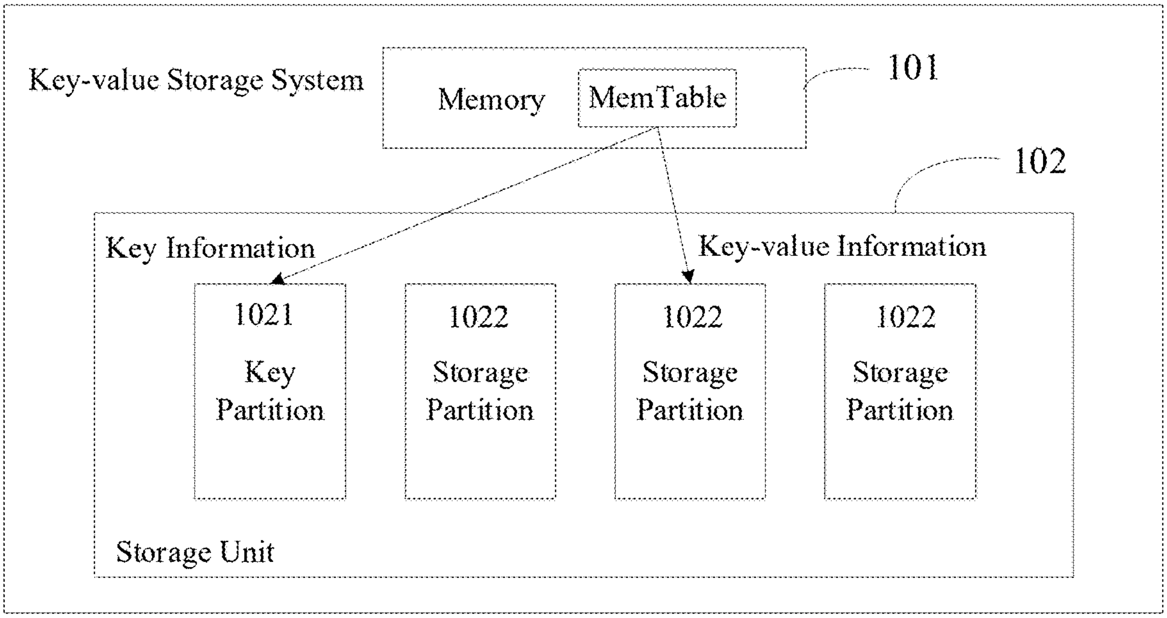
FIG. 1 is a schematic structural diagram of a key-value storage system for key-value separation provided by an embodiment of the present disclosure.

In order to clarify the objectives, technical solutions, and advantages of the embodiments of the present disclosure, the technical solutions in the embodiments of the present disclosure will be clearly and completely described with reference to the accompanying drawings in the embodiments of the present disclosure. Obviously, the described embodiments are only a part of the embodiments of the present disclosure, not all of the embodiments. Based on the embodiments of the present disclosure, all other embodiments obtained by those skilled in the art without inventive efforts are within the protection scope of the present disclosure.

It should be noted that user information (including but not limited to user device information, user personal information, etc.) and data (including but not limited to data for analysis, stored data, displayed data, etc.) involved in the present disclosure are all information and data authorized by users or fully authorized by all parties, the collection, use and processing of relevant data require compliance with relevant laws and regulations as well as standards, and corresponding operation portals are provided for users to choose to authorize or reject.

At present, the key-value storage system based on the log-structured merge tree (LSMT) can receive key-value records corresponding to write operations through a memory table (e.g., MemTable). The key-value records written by the user are organized in the MemTable according to the order of keys. When the size of the key-value records in the MemTable reaches a certain threshold, it will store key-value records in a storage unit of the key-value storage system in the form of a sorted string table (SST). Optionally, the storage unit is a persistent storage medium (for example, a hard disk drive or a solid state disk), and the SST file can be refreshed to the underlying persistent storage medium through a flush thread.

However, with the updating of the key-value records in the LSMT, the number of invalid key-value records accumulated in the SST file is increasing. Thus, it needs to perform garbage collection processing on the invalid key-value records in the SST file.

In the related art, the invalid key-value records in the SST file are subjected to garbage collection processing by performing compression processing on the SST file. The specific steps include: determining valid key-value records and invalid key-value records in the SST file, deleting the invalid key-value records in the SST file, and transferring and storing the valid key-value records in the SST file to other SST files. However, when the invalid key-value records in the SST file are subjected to garbage collection processing, it needs to transfer and store the valid key-value records in the SST file to other SST files, which may increase write operations of the key-value records and cause write amplification of the key-value storage system, and thus the above information processing in the related art is low in efficiency.

Further, the LSM-tree key-value storage system constructed on a solid state disk (SSD) has the problem of two-level garbage collection (two-level GC). The first level is that the LSM-tree key-value storage system itself needs to perform garbage collection processing on the overdue key-value records. The second level is that there is a device garbage collection mechanism transparent to the user inside an underlying SSD device (that is, the user can trigger the garbage collection of the SSD device). Since the two levels of garbage collection are separated from each other, this further aggravates the problem of the write amplification.

Thus, it can be seen that how to reduce the write amplification of the key-value storage system so as to improve the information processing efficiency is an urgent problem to be solved at present.

The compression operation of the LSMT key-value storage system in the related art may bring a serious write-amplification problem, which is rooted in the duplication of the value part of the key-value record by the compression processing. Therefore, in order to reduce the write operations of the key-value records, the LSMT key-value storage system with key-value separation can be adopted. The SST file in the LSMT only stores information of the key part, while information of the value part is stored separately in the other partition. In this way, when the SST file is compressed, it only needs to duplicate the key part in the key-value record, and the amount of duplicated data is reduced, thus reducing the write amplification of the key-value storage system and improving the information processing efficiency.

However, the LSMT key-value storage system with key-value separation still has the problem of the write amplification. For example, the LSMT key-value storage system with key-value separation may be a zoned namespace SSD (ZNS SSD), e.g., a solid state disk system based on a zone space, and the ZNS SSD system includes a plurality of storage units which are separately partitioned. The storage unit may be a key partition or a storage partition. Optionally, the ZNS SSD system includes a key partition and a plurality of storage partitions, the key partition is used for storing log-structured merge tree (LSMT) information, and the storage partitions are used for storing key-value information. However, since the storage partition and the key partition are subjected to garbage collection separately, the garbage collection frequency of the key-value storage system is relatively high.

Therefore, in order to further reduce the write amplification of the key-value storage system, the embodiments of the present disclosure provide the following technical concepts: a garbage collection granularity of LSMT information is aligned with a garbage collection granularity of the storage partition, so that the LSMT information and the storage partition are subjected to garbage collection at the same time. The specific processing method includes: firstly, selecting, according to the LSMT information in the key partition, a target storage partition with the highest invalid information rate from the plurality of storage partitions included in the storage unit; then, detecting validity information corresponding to each key-value information in the target storage partition, and screening out valid key-value information from multiple key-value information stored in the target storage partition according to the validity information corresponding to each key-value information; and finally, transferring and storing the valid key-value information to a first storage partition except for the target storage partition, and erasing the multiple key-value information stored in the target storage partition.

In this case, according to the LSMT information, the target storage partition with the highest invalid information rate is selected from the plurality of storage partitions included in the storage unit, the key-value information in the target storage partition is processed, the garbage collection granularity of the LSMT information is aligned with the garbage collection granularity of the storage partition, and while the LSMT information is subjected to garbage collection, the storage partition is also subjected to garbage collection. Compared with a recycling method alone, the frequency of garbage collection is reduced and the write amplification of the key-value information is reduced, thus improving the data processing efficiency.

An application scenario of the embodiment of the present disclosure is illustrated below.

The information processing method provided by the embodiment of the present disclosure may be applied to the scenario where data is subjected to consistency processing. FIG. 1 is a schematic structural diagram of a key-value storage system for key-value separation provided by an embodiment of the present disclosure. As shown in FIG. 1, the key-value storage system includes a memory 101 and a storage unit 102, and the storage unit 102 includes a key partition 1021 and a plurality of storage partitions 1022. The key-value storage system may receive a key-value record corresponding to a write operation through a memory table MemTable and store the MemTable in the memory, and when the size of key-value records in the MemTable reaches a certain threshold, the key-value storage system stores the key information in the key-value records and the location information of the key-value records in the key partition 1021 and stores the key-value records in the storage partitions 1022 through the SST file. When the key-value record needs to be called, the location information of the corresponding key-value record can be queried through the key information, and the key-value record can be called from the storage partition 1022 through the location information of the key-value record. Optionally, the key-value storage system with key-value separation in FIG. 1 may be a ZNS solid state disk. Accordingly, the information processing method provided by the embodiment of the present disclosure may be applied to the scenario where garbage collection for the ZNS solid state disk is performed. The information processing method provided by the embodiment of the present disclosure will be described in detail with detailed embodiments.

Figure 2:
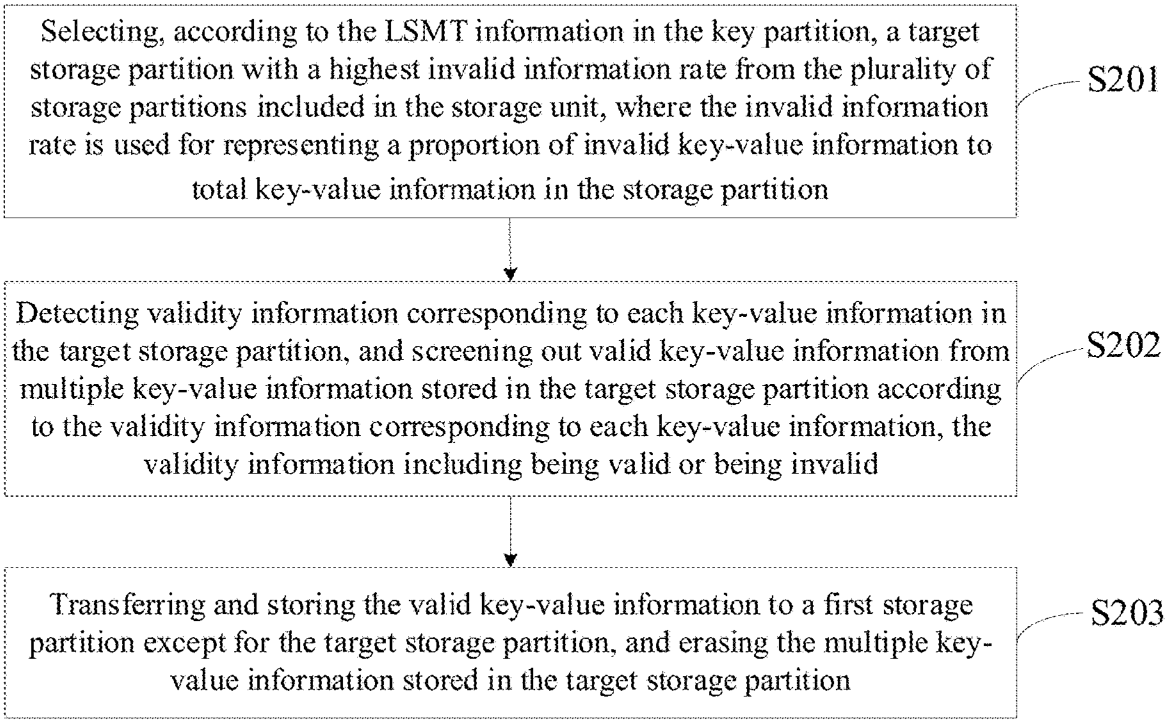
FIG. 2 is a flowchart of an information processing method provided by an embodiment of the present disclosure.

FIG. 2 is a flowchart of an information processing method provided by an embodiment of the present disclosure. The information processing may be applied to a key-value storage system with key-value separation, a storage unit in the key-value storage system includes a key partition and a plurality of storage partitions, the key partition is used for storing log-structured merge tree (LSMT) information, and the storage partitions are used for storing key-value information. As shown in FIG. 2, the method includes:

S201: selecting, according to the LSMT information in the key partition, a target storage partition with a highest invalid information rate from the plurality of storage partitions included in the storage unit, where the invalid information rate is used for representing a proportion of invalid key-value information to total key-value information in the storage partition.

In the embodiment of the present disclosure, the LSMT information includes multiple index information, and the index information includes key information and storage location information of key-value information corresponding to the key information. It should be noted that a plurality of SST files may be included in the key partition, and the multiple index information can be stored through the SST files.

Optionally, the storage location information may include a file identifier where the key-value information is located. For example, the storage location information is a file A. Optionally, the storage location information may include a file identifier where the key-value information is located and a storage partition identifier where the file identifier is located. For example, the storage location information is a file A and a storage partition 1. The key-value information may be the key-value record.

In the embodiment of the present disclosure, the storage partition may be represented as Zone. When the LSMT information is compressed, the deleted key information in the multiple index information can be synchronized to each corresponding storage partition Zone. In this way, the storage partition can obtain the invalid information rate (that is, a garbage rate) of the storage partition.

Accordingly, selecting, according to the LSMT information in the key partition, the target storage partition with the highest invalid information rate from the plurality of storage partitions included in the storage unit includes: in response to performing compression processing on the multiple index information included in the LSMT information, recording deleted key information in the multiple index information to obtain statistical information; for each storage partition in the storage unit, determining the number of invalid key-value information in the storage partition according to the statistical information, where the invalid key-value information is key-value information corresponding to the deleted key information; and taking a ratio of the number of the invalid key-value information in the storage partition to the total number of key-value information stored in the storage partition as the invalid information rate of the storage partition, and selecting the target storage partition with the highest invalid information rate from the plurality of storage partitions.

Optionally, the statistical information includes multiple deleted key information and the storage partition where the key-value information corresponding to each key information is located. Accordingly, determining the number of invalid key-value information in the storage partition according to the statistical information includes: determining each deleted key information in the statistical information sequentially, and adding one to the number of invalid key-value information in the storage partition corresponding to the key information.

Exemplarily, the number of invalid key-value information in the storage partition may be represented by $N_{stale}$. The total number of key-value information stored in the storage partition may be represented by $N_{total}$. Accordingly, the invalid information rate may be represented as $N_{stale}/N_{total}$.

It should be noted that when the storage number of storage units meets a preset condition, the target storage partition with the highest invalid information rate is selected from the plurality of storage partitions for garbage collection processing.

In some embodiments, when the storage number of the storage units is greater than a preset value, the target storage partition with the highest invalid information rate is selected from the plurality of storage partitions included in the storage unit according to the LSMT information in the key partition. In this embodiment, the preset numerical value is not specifically limited. Optionally, the preset numerical value may be a preset multiple of a total number of storage units. For example, the preset numerical value may be 0.8 times, 0.85 times, or the like of the total number of storage units.

In other embodiments, when an interval between the last time the target storage partition is selected and the current time reaches a preset duration, the target storage partition with the highest invalid information rate is selected from the plurality of storage partitions included in the storage unit according to the LSMT information in the key partition. In this embodiment, the value of the preset duration is not specifically limited. Optionally, the preset duration may be one day, two days, etc.

S202: detecting validity information corresponding to each key-value information in the target storage partition, and screening out valid key-value information from multiple key-value information stored in the target storage partition according to the validity information corresponding to each key-value information, the validity information including being valid or being invalid.

In the embodiment of the present disclosure, the validity information corresponding to the key-value information may be determined according to whether the key information in the key-value information is the latest key information.

Optionally, the LSMT information includes multiple index information, and the index information includes key information and storage location information of key-value information corresponding to the key information. Correspondingly, whether the key information in the key-value information is the latest key information can be determined according to the key information in the index information. The specific steps of detecting the validity information corresponding to each key-value information in the target storage partition includes: for each key-value information, determining key information corresponding to the key-value information, the key information including a key and a key identifier, and the key identifier being used for representing a version corresponding to the key; determining, according to the key in the key information, a latest version of the key identifier corresponding to the key from the multiple index information, and determining whether the key identifier in the key information is identical to the latest version of the key identifier; in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

Exemplarily, the key-value information 1 is: key_A+seq1, value1. The key information corresponding to the key-value information 1 is key_A+seq1. The key in the key information is key_A, and the key identifier in the key information is seq1. The multiple index information includes: "key_A+seq1, file1," "key_A+seq2, file2," "key_A+seq3, file3." According to the key (key_A) in the key information, the latest version of the key identifier corresponding to the key is determined as seq3 from the multiple index information. If it is determined that the key identifier (seq1) in the key information is different from the latest version of the key identifier (seq3), it is determined that the validity information corresponding to the key-value information (key_A+seq1, value1) is invalid.

It should be noted that when the number of index information in the key partition LSM-tree is large, it may take a long time to determine the validity information corresponding to the key-value information. Therefore, on the basis of ensuring the detection accuracy, different detection methods can be adopted according to the type of the storage partition where the key-value information is located.

Optionally, types of the storage partitions include a first heat level storage partition, a second heat level storage partition, and a third heat level storage partition, the heat value of the key-value information stored in the first heat level storage partition is greater than the heat value of the key-value information stored in the second heat level storage partition, the heat value of the key-value information stored in the second heat level storage partition is greater than the heat value of the key-value information stored in the third heat level storage partition, and the heat value is used for representing updating times of key information corresponding to the key-value information. For example, the first heat level storage partition may be represented as a hot partition, the second heat level storage partition may be represented as a warm partition, and the third heat level storage partition may be represented as a cold partition. In the embodiment of the present disclosure, the number of the first heat level storage partitions, the number of the second heat level storage partitions, or the number of the third heat level storage partitions is not specifically limited.

In some embodiments, the type of the target storage partition may be determined first. If the type of the target storage partition is the first heat level storage partition or the second heat level storage partition, the validity of the key-value information is not determined according to the key information in the index information. If the type of the target storage partition is the third heat level storage partition, the validity of the key-value information is determined according to the key information in the index information.

Optionally, before determining, according to the key in the key information, the latest version of the key identifier corresponding to the key from the multiple index information, the method further includes: determining a type of the target storage partition; when the type of the target storage partition is the first heat level storage partition or the second heat level storage partition, determining whether the key identifier in the key information is the latest version of the key identifier in the target storage partition, determining that the validity information corresponding to the key-value information is valid in response to the key identifier in the key information being the latest version of the key identifier in the target storage partition, and determining that the validity information corresponding to the key-value information is invalid in response to the key identifier in the key information not the latest version of the key identifier in the target storage partition; and when the type of the target storage partition is the third heat level storage partition, performing the step of determining, according to the key in the key information, the latest version of the key identifier corresponding to the key from the multiple index information.

Here, since in the first heat level storage partition or the second heat level storage partition, the probability that multiple key-value information correspond to the same key information is high, it is enough to check the validity. In this way, the detection efficiency can be improved on the basis of ensuring the detection accuracy.

S203: transferring and storing the valid key-value information to a first storage partition except for the target storage partition, and erasing the multiple key-value information stored in the target storage partition.

In the embodiment of the present disclosure, the first storage partition has the same type as the target storage partition. Accordingly, this step includes: determining the first storage partition with the same type as the target storage partition from the plurality of storage partitions except for the target storage partition; and transferring and storing the valid key-value information to the first storage partition.

For example, if the target storage partition is a hot partition, the first storage partition is also a hot partition.

Here, since the updating times of key-value information in the same type of storage partition is similar, the number of valid key-value information in the storage partition can be reduced, and transferring and storing of valid key-value information can be reduced, thereby improving the information processing efficiency.

It should be noted that the number of valid key-value information may be zero, one or more. When the number of valid key-value information is zero, the multiple key-value information stored in the target storage partition can be directly erased without performing the step of transferring and storing the valid key-value information.

The information processing method provided by this embodiment includes: selecting, according to the LSMT information in the key partition, the target storage partition with the highest invalid information rate from the plurality of storage partitions included in the storage unit, the invalid information rate being used for representing a proportion of invalid key-value information to total key-value information in the storage partition; detecting validity information corresponding to each key-value information in the target storage partition, and screening out valid key-value information from multiple key-value information stored in the target storage partition according to the validity information corresponding to each key-value information, the validity information including being valid or being invalid; and transferring and storing the valid key-value information to a first storage partition except for the target storage partition, and erasing the multiple key-value information stored in the target storage partition. In the embodiments of the present disclosure, according to the LSMT information, the target storage partition with the highest invalid information rate is selected from the plurality of storage partitions included in the storage unit, the key-value information in the target storage partition is processed, a garbage collection granularity of the LSMT information is aligned with a garbage collection granularity of the storage partition, and while the LSMT information is subjected to garbage collection, the storage partition is also subjected to garbage collection. Compared with a recycling method alone, the frequency of garbage collection is reduced and the write amplification of the key-value information is reduced, thus improving the data processing efficiency.

It should be noted that in order to further reduce the write amplification of key-value information, for the transferred key-value information, the index information corresponding to the key-value information is not transferred, but only updated.

Accordingly, after transferring and storing the valid key-value information to the first storage partition except for the target storage partition, the method further includes: for each valid key-value information, acquiring target index information corresponding to the valid key-value information from the multiple index information; and determining migration path information of the valid key-value information transferred from the target storage partition to the first storage partition, and adding the migration path information to the target index information to obtain new index information corresponding to the valid key-value information.

When certain key-value information needs to be queried, the key-value information is retrieved from the storage partition according to the target index information and migration path information corresponding to the key-value information.

Figure 3:
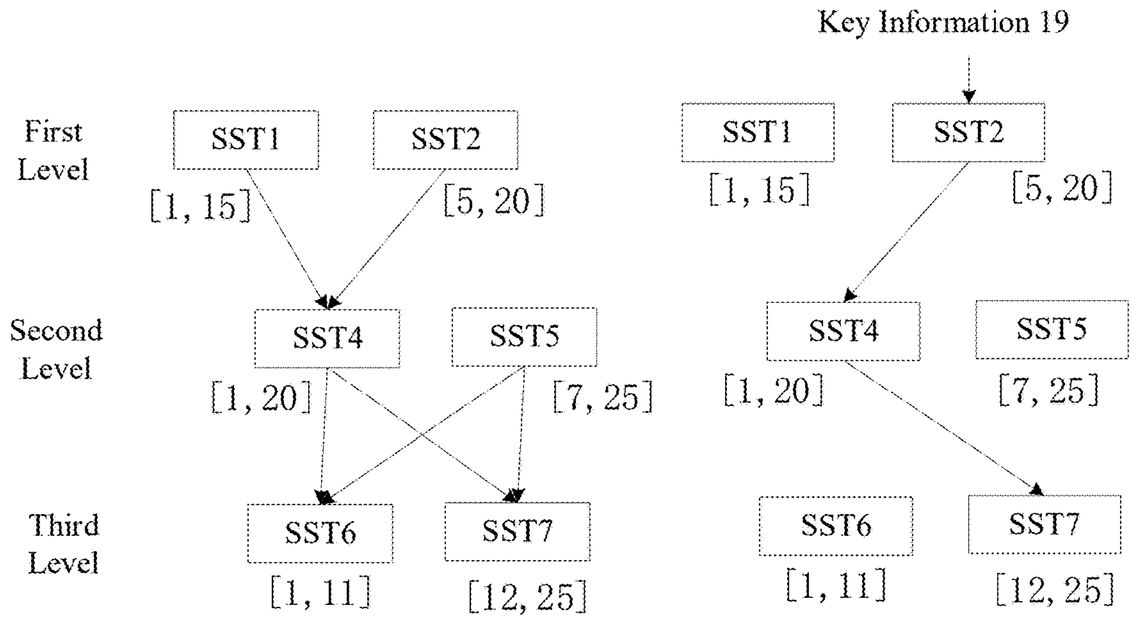
FIG. 3 is a schematic diagram of an information processing method provided by an embodiment of the present disclosure.

For example, as shown in FIG. 3, the index information includes SST1, SST2, SST4, SST5, SST6, and SST7. SST1 and SST2 are located at the first level in LSMT information, a key-value interval of the key information stored by SST1 is [1, 15], and a key-value interval of the key information stored by SST2 is [5, 20]. SST4 and SST5 are located at the second level in LSMT information, a key-value interval of the key information stored by SST4 is [1, 20], and a key-value interval of the key information stored by SST5 is [7, 25]. SST6 and SST7 are located at the third level in LSMT information, a key-value interval of the key information stored by SST6 is [1, 11], and a key-value interval of the key information stored by SST7 is [12, 25]. As shown in FIG. 3, if the key information of the key-value information is 19, the target index information corresponding to the key information 19 is SST2. The migration path information corresponding to SST2 is SST2→SST4→SST7.

Figure 4:
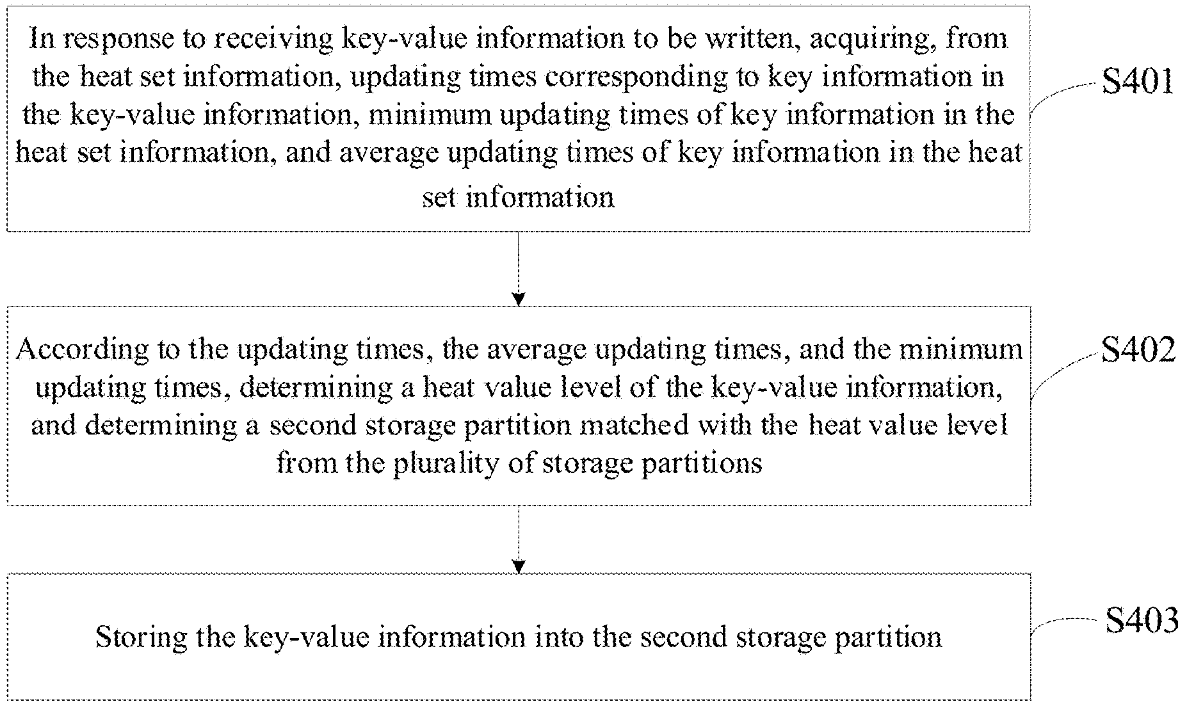
FIG. 4 is a flowchart of another information processing method provided by an embodiment of the present disclosure.

FIG. 4 is a flowchart of another information processing method provided by an embodiment of the present disclosure. In this embodiment, the key-value storage system further includes heat set information, and the heat set information includes average updating times of key information and updating times of key information corresponding to each index information. Optionally, when the key-value information in the memory table MemTable is downloaded to the storage unit, the updating times of each key-value information may be determined first, and then the key-value information is stored in the corresponding type of storage partition according to the updating times. As shown in FIG. 4, the method for writing key-value information includes:

S401: in response to receiving key-value information to be written, acquiring, from the heat set information, updating times corresponding to key information in the key-value information, minimum updating times of key information in the heat set information, and average updating times of key information in the heat set information.

In the embodiment of the present disclosure, the heat set information maintains the updating times of each key. After the storage partition is subjected to garbage collection processing, a newly added updating frequency of each key information in the storage partition is transmitted into the heat set information, and the newly added updating frequency is added to the updating frequency of the key information. The heat set information may be represented by Hotness Set.

The heat set information also includes the average updating times of key information. The average updating times of the key information is determined based on the updating times of the deleted key information in the heat set information and the updating times of already deleted key information. It should be noted that the heat set information cannot maintain the frequency of occurrence for all the keys that appear, otherwise the occupation of the memory space is too large. Optionally, the number of keys maintained by the heat set information may be limited to a preset number. In this embodiment, the value of the preset number is not specifically limited. Exemplarily, the preset number may be 0.5% of the entire storage space of the memory unit. When the number of keys maintained by the heat set information reaches the preset number, the key with the minimum updating times in the heat set information may be selected for replacement.

S402: according to the updating times, the average updating times, and the minimum updating times, determining a heat value level of the key-value information, and determining a second storage partition matched with the heat value level from the plurality of storage partitions.

Optionally, types of the storage partitions include a first heat level storage partition, a second heat level storage partition, and a third heat level storage partition, the heat value of the key-value information stored in the first heat level storage partition is greater than the heat value of the key-value information stored in the second heat level storage partition, the heat value of the key-value information stored in the second heat level storage partition is greater than the heat value of the key-value information stored in the third heat level storage partition, and the heat value is used for representing updating times of key information corresponding to the key-value information. Correspondingly, the step includes: in response to the updating times being greater than the average updating times, determining the heat value level of the key-value information as a first heat level, and determining the first heat level storage partition from the plurality of storage partitions as the second storage partition; in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

S403: storing the key-value information into the second storage partition.

In the embodiment of the present disclosure, when the key-value information is downloaded to the storage unit, the updating times of the key-value information is determined first, and then the key-value information is stored in the corresponding type of the storage partition according to the updating times. In this way, the updating times of the key-value information in the storage partition of the same type is similar, and when the storage partition is subjected to garbage collection, the number of valid key-value information in the storage partition can be reduced, and transferring and storing of the valid key-value information can be reduced, thereby further improving the information processing efficiency.

Figure 5:
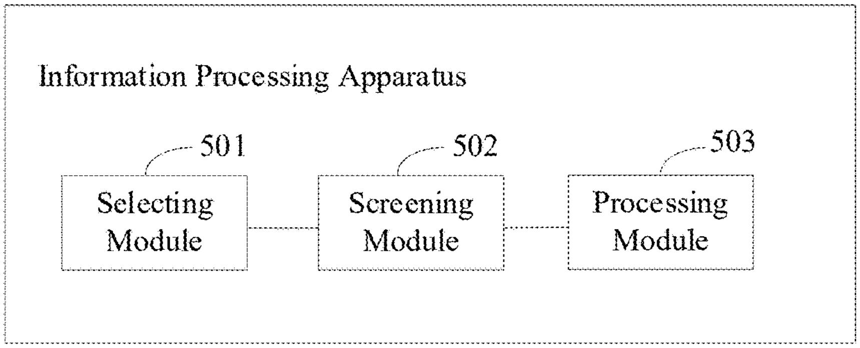
FIG. 5 is a structural block diagram of an information processing apparatus provided by an embodiment of the present disclosure.

FIG. 5 is a structural block diagram of an information processing apparatus provided by an embodiment of the present disclosure. The information processing apparatus is applied to a key-value storage system for key-value separation, a storage unit in the key-value storage system includes a key partition and a plurality of storage partitions, the key partition is used for storing log-structured merge tree (LSMT) information, and the plurality of storage partitions are used for storing key-value information. With reference to FIG. 5, the apparatus includes: a selecting module 501, a screening module 502, and a processing module 503.

The selecting module 501 is configured to select, according to the LSMT information in the key partition, a target storage partition with a highest invalid information rate from the plurality of storage partitions included in the storage unit. The invalid information rate is used for representing a proportion of invalid key-value information to total key-value information in the storage partition.

The screening module 502 is configured to detect validity information corresponding to each key-value information in the target storage partition, and screen out valid key-value information from multiple key-value information stored in the target storage partition according to the validity information corresponding to each key-value information. The validity information includes being valid or being invalid.

The processing module 503 is configured to transfer and store the valid key-value information to a first storage partition except for the target storage partition, and erase the multiple key-value information stored in the target storage partition.

According to one or more embodiments of the present disclosure, the LSMT information comprises multiple index information, and the index information comprises key information and storage location information of key-value information corresponding to the key information. Accordingly, for the selecting module 501, selecting, according to the LSMT information in the key partition, the target storage partition with the highest invalid information rate from the plurality of storage partitions comprised in the storage unit specifically comprises: in response to performing compression processing on the multiple index information comprised in the LSMT information, recording deleted key information in the multiple index information to obtain statistical information; for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

According to one or more embodiments of the present disclosure, the LSMT information comprises multiple index information, and the index information comprises key information and storage location information of key-value information corresponding to the key information. Accordingly, for the screening module 502, detecting the validity information corresponding to each key-value information in the target storage partition specifically comprises: for each key-value information, determining key information corresponding to the key-value information, wherein the key information comprises a key and a key identifier, and the key identifier is used for representing a version corresponding to the key; determining, according to the key in the key information, a latest version of the key identifier corresponding to the key from the multiple index information, and determining whether the key identifier in the key information is identical to the latest version of the key identifier; in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, and the heat value is used for representing updating times of key information corresponding to the key-value information.

Correspondingly, the apparatus further comprises a verification module, and the verification module is configured to: determine a type of the target storage partition; when the type of the target storage partition is the first heat level storage partition or the second heat level storage partition, determine whether the key identifier in the key information is the latest version of the key identifier in the target storage partition, determine that the validity information corresponding to the key-value information is valid in response to the key identifier in the key information being the latest version of the key identifier in the target storage partition, and determine that the validity information corresponding to the key-value information is invalid in response to the key identifier in the key information not the latest version of the key identifier in the target storage partition; and when the type of the target storage partition is the third heat level storage partition, determine, according to the key in the key information, the latest version of the key identifier corresponding to the key from the multiple index information.

According to one or more embodiments of the present disclosure, for the processing module 503, transferring and storing the valid key-value information to the first storage partition except for the target storage partition specifically comprises: determining the first storage partition with a same type as the target storage partition from the plurality of storage partitions except for the target storage partition; and transferring and storing the valid key-value information to the first storage partition.

According to one or more embodiments of the present disclosure, the LSMT information comprises multiple index information, the apparatus further comprises an updating module, and the updating module is configured to: for each valid key-value information, acquire target index information corresponding to the valid key-value information from the multiple index information; and determine migration path information of the valid key-value information transferred from the target storage partition to the first storage partition, and add the migration path information to the target index information to obtain new index information corresponding to the valid key-value information.

According to one or more embodiments of the present disclosure, the key-value storage system further comprises heat set information, the heat set information comprises average updating times of key information and updating times of key information corresponding to each index information, the apparatus further comprises a writing module, and the writing module is configured to: in response to receiving key-value information to be written, acquire, from the heat set information, updating times corresponding to key information in the key-value information, minimum updating times of key information in the heat set information, and average updating times of key information in the heat set information; according to the updating times, the average updating times, and the minimum updating times, determine a heat value level of the key-value information, and determine a second storage partition matched with the heat value level from the plurality of storage partitions; and store the key-value information into the second storage partition.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, and the heat value is used for representing updating times of key information corresponding to the key-value information. Accordingly, for the writing module, according to the updating times, the average updating times, and the minimum updating times, determining the heat value level of the key-value information, and determining the second storage partition matched with the heat value level from the plurality of storage partitions specifically comprises: in response to the updating times being greater than the average updating times, determining the heat value level of the key-value information as a first heat level, and determining the first heat level storage partition from the plurality of storage partitions as the second storage partition; in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

The selecting module 501, the screening module 502, and the processing module 503 are connected sequentially. The information processing apparatus provided by the embodiments of the present disclosure can execute the technical solutions of the above-mentioned method embodiments, and has similar implementation principle and technical effects, and details are not repeated here again.

Figure 6:
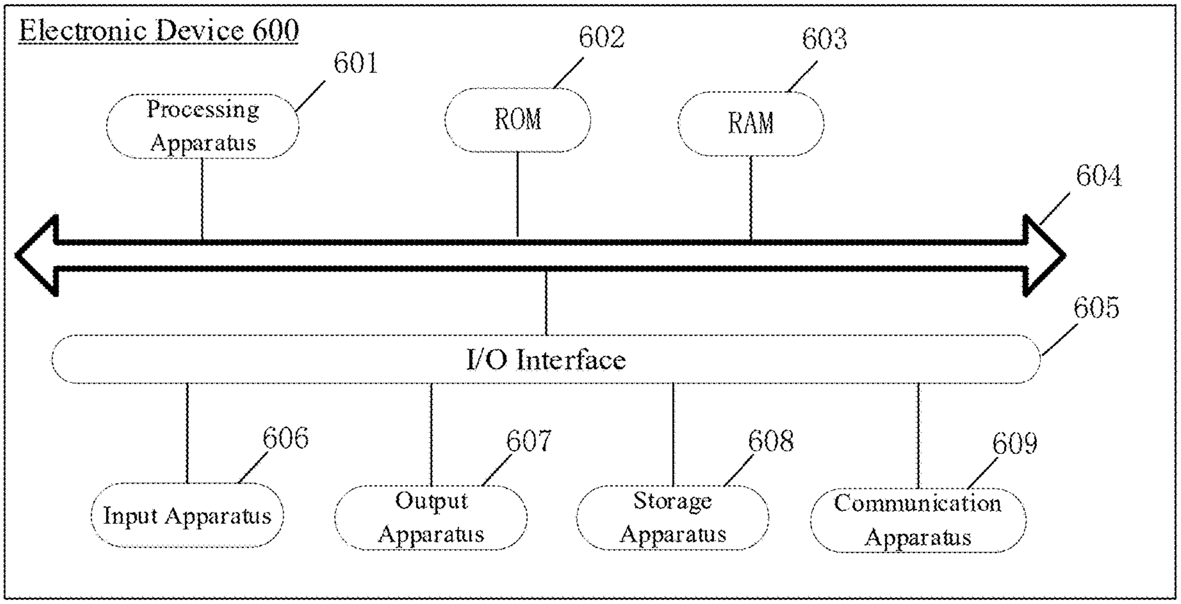
FIG. 6 is a schematic structural diagram of hardware of an electronic device provided by an embodiment of the present disclosure.

FIG. 6 is a schematic structural diagram of hardware of an electronic device provided by an embodiment of the present disclosure. With reference to FIG. 6, the electronic device 600 may be a terminal device or a server. The terminal device may include, but not limited to, mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. The electronic device shown in FIG. 6 is merely an example and should not impose any limitations on the functions and scope of use of the embodiments of the present disclosure.

As illustrated in FIG. 6, the electronic device 600 may include a processing apparatus 601 (e.g., a central processing unit, a graphics processing unit, etc.), which may execute various appropriate actions and processing according to a program stored on a read-only memory (ROM) 602 or a program loaded from a storage apparatus 608 into a random access memory (RAM) 603. The RAM 603 further stores various programs and data required for operation of the electronic device 600. The processing apparatus 601, the ROM 602, and the RAM 603 are connected with each other through a bus 604. An input/output (I/O) interface 605 is also connected to the bus 604.

Usually, apparatuses below may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a speaker, a vibrator, or the like; a storage apparatus 608 including, for example, a magnetic tape, a hard disk, or the like; and a communication apparatus 609. The communication apparatus 609 may allow the electronic device 600 to perform wireless or wired communication with other devices so as to exchange data. Although FIG. 6 shows the electronic device 600 having various apparatuses, it should be understood that it is not required to implement or have all the apparatuses illustrated, and the electronic device may alternatively implement or have more or fewer apparatuses.

Specifically, according to the embodiments of the present disclosure, the process described above with reference to the flowchart may be implemented as a computer software program. For example, the embodiments of the present disclosure include a computer program product, including a computer program carried on a computer-readable medium, and the computer program includes program codes for executing the method shown in the flowchart. In such embodiments, the computer program may be downloaded and installed from the network via the communication apparatus 609, or installed from the storage apparatus 608, or installed from the ROM 602. When executed by the processing apparatus 601, the computer program may implement the above functions defined in the method provided by the embodiments of the present disclosure.

It should be noted that the computer-readable medium described in the present disclosure may be a computer-readable signal medium or a computer-readable storage medium, or any combination thereof. The computer-readable storage medium may be, but not limited to, an electric, magnetic, optical, electromagnetic, infrared, or semiconductor system, apparatus or device, or any combination thereof. For example, the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to, an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to, an electric wire, a fiber-optic cable, radio frequency (RF) and the like, or any appropriate combination of them.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to implement the method as illustrated in the above embodiments.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Here the name of the unit does not constitute a limitation of the unit itself under certain circumstances. For example, the first acquisition unit may also be described as a "unit acquiring at least two Internet protocol addresses."

The functions described herein above may be performed, at least partially, by one or more hardware logic components. For example, without limitation, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. Examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

In the first aspect, according to one or more embodiments of the present disclosure, an information processing method is provided, the method is applied to a key-value storage system for key-value separation, a storage unit in the key-value storage system comprises a key partition and a plurality of storage partitions, the key partition is used for storing log-structured merge tree (LSMT) information, the plurality of storage partitions are used for storing key-value information, and the method comprises:

selecting, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;

detecting validity information corresponding to each key-value information in the target storage partition, and screening out valid key-value information from multiple key-value information stored in the target storage partition according to the validity information corresponding to each key-value information, wherein the validity information comprises being valid or being invalid; and transferring and storing the valid key-value information to a first storage partition except for the target storage partition, and erasing the multiple key-value information stored in the target storage partition.

According to one or more embodiments of the present disclosure, the LSMT information comprises multiple index information, the index information comprises key information and storage location information of key-value information corresponding to the key information, and selecting, according to the LSMT information in the key partition, the target storage partition with the highest invalid information rate from the plurality of storage partitions comprised in the storage unit comprises: in response to performing compression processing on the multiple index information comprised in the LSMT information, recording deleted key information in the multiple index information to obtain statistical information; for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

According to one or more embodiments of the present disclosure, the LSMT information comprises multiple index information, the index information comprises key information and storage location information of key-value information corresponding to the key information, and detecting the validity information corresponding to each key-value information in the target storage partition comprises: for each key-value information, determining key information corresponding to the key-value information, wherein the key information comprises a key and a key identifier, and the key identifier is used for representing a version corresponding to the key; determining, according to the key in the key information, a latest version of the key identifier corresponding to the key from the multiple index information, and determining whether the key identifier in the key information is identical to the latest version of the key identifier; in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and before determining, according to the key in the key information, the latest version of the key identifier corresponding to the key from the multiple index information, the method further comprises: determining a type of the target storage partition; when the type of the target storage partition is the first heat level storage partition or the second heat level storage partition, determining whether the key identifier in the key information is the latest version of the key identifier in the target storage partition, determining that the validity information corresponding to the key-value information is valid in response to the key identifier in the key information being the latest version of the key identifier in the target storage partition, and determining that the validity information corresponding to the key-value information is invalid in response to the key identifier in the key information not the latest version of the key identifier in the target storage partition; and when the type of the target storage partition is the third heat level storage partition, determining, according to the key in the key information, the latest version of the key identifier corresponding to the key from the multiple index information.

According to one or more embodiments of the present disclosure, transferring and storing the valid key-value information to the first storage partition except for the target storage partition comprises: determining the first storage partition with a same type as the target storage partition from the plurality of storage partitions except for the target storage partition; and transferring and storing the valid key-value information to the first storage partition.

According to one or more embodiments of the present disclosure, the LSMT information comprises multiple index information, and after transferring and storing the valid key-value information to the first storage partition except for the target storage partition, the method further comprises: for each valid key-value information, acquiring target index information corresponding to the valid key-value information from the multiple index information; and determining migration path information of the valid key-value information transferred from the target storage partition to the first storage partition, and adding the migration path information to the target index information to obtain new index information corresponding to the valid key-value information.

According to one or more embodiments of the present disclosure, the key-value storage system further comprises heat set information, the heat set information comprises average updating times of key information and updating times of key information corresponding to each index information, and the method further comprises: in response to receiving key-value information to be written, acquiring, from the heat set information, updating times corresponding to key information in the key-value information, minimum updating times of key information in the heat set information, and average updating times of key information in the heat set information; according to the updating times, the average updating times, and the minimum updating times, determining a heat value level of the key-value information, and determining a second storage partition matched with the heat value level from the plurality of storage partitions; and storing the key-value information into the second storage partition.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and according to the updating times, the average updating times, and the minimum updating times, determining the heat value level of the key-value information, and determining the second storage partition matched with the heat value level from the plurality of storage partitions comprises: in response to the updating times being greater than the average updating times, determining the heat value level of the key-value information as a first heat level, and determining the first heat level storage partition from the plurality of storage partitions as the second storage partition; in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

In the second aspect, according to one or more embodiments of the present disclosure, an information processing apparatus is applied, the apparatus is applied to a key-value storage system for key-value separation, a storage unit in the key-value storage system comprises a key partition and a plurality of storage partitions, the key partition is used for storing log-structured merge tree (LSMT) information, the plurality of storage partitions are used for storing key-value information, and the apparatus comprises:

a selecting module, configured to select, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;

a screening module, configured to detect validity information corresponding to each key-value information in the target storage partition, and screen out valid key-value information from multiple key-value information stored in the target storage partition according to the validity information corresponding to each key-value information, wherein the validity information comprises being valid or being invalid; and a processing module, configured to transfer and store the valid key-value information to a first storage partition except for the target storage partition, and erase the multiple key-value information stored in the target storage partition.

According to one or more embodiments of the present disclosure, the LSMT information comprises multiple index information, and the index information comprises key information and storage location information of key-value information corresponding to the key information. Accordingly, for the selecting module, selecting, according to the LSMT information in the key partition, the target storage partition with the highest invalid information rate from the plurality of storage partitions comprised in the storage unit specifically comprises: in response to performing compression processing on the multiple index information comprised in the LSMT information, recording deleted key information in the multiple index information to obtain statistical information; for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

According to one or more embodiments of the present disclosure, the LSMT information comprises multiple index information, and the index information comprises key information and storage location information of key-value information corresponding to the key information. Accordingly, for the screening module, detecting the validity information corresponding to each key-value information in the target storage partition specifically comprises: for each key-value information, determining key information corresponding to the key-value information, wherein the key information comprises a key and a key identifier, and the key identifier is used for representing a version corresponding to the key; determining, according to the key in the key information, a latest version of the key identifier corresponding to the key from the multiple index information, and determining whether the key identifier in the key information is identical to the latest version of the key identifier; in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, and the heat value is used for representing updating times of key information corresponding to the key-value information.

Correspondingly, the apparatus further comprises a verification module, and the verification module is configured to: determine a type of the target storage partition; when the type of the target storage partition is the first heat level storage partition or the second heat level storage partition, determine whether the key identifier in the key information is the latest version of the key identifier in the target storage partition, determine that the validity information corresponding to the key-value information is valid in response to the key identifier in the key information being the latest version of the key identifier in the target storage partition, and determine that the validity information corresponding to the key-value information is invalid in response to the key identifier in the key information not the latest version of the key identifier in the target storage partition; and when the type of the target storage partition is the third heat level storage partition, determine, according to the key in the key information, the latest version of the key identifier corresponding to the key from the multiple index information.

According to one or more embodiments of the present disclosure, for the processing module, transferring and storing the valid key-value information to the first storage partition except for the target storage partition specifically comprises: determining the first storage partition with a same type as the target storage partition from the plurality of storage partitions except for the target storage partition; and transferring and storing the valid key-value information to the first storage partition.

According to one or more embodiments of the present disclosure, the LSMT information comprises multiple index information, the apparatus further comprises an updating module, and the updating module is configured to: for each valid key-value information, acquire target index information corresponding to the valid key-value information from the multiple index information; and determine migration path information of the valid key-value information transferred from the target storage partition to the first storage partition, and add the migration path information to the target index information to obtain new index information corresponding to the valid key-value information.

According to one or more embodiments of the present disclosure, the key-value storage system further comprises heat set information, the heat set information comprises average updating times of key information and updating times of key information corresponding to each index information, the apparatus further comprises a writing module, and the writing module is configured to: in response to receiving key-value information to be written, acquire, from the heat set information, updating times corresponding to key information in the key-value information, minimum updating times of key information in the heat set information, and average updating times of key information in the heat set information; according to the updating times, the average updating times, and the minimum updating times, determine a heat value level of the key-value information, and determine a second storage partition matched with the heat value level from the plurality of storage partitions; and store the key-value information into the second storage partition.

According to one or more embodiments of the present disclosure, types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, and the heat value is used for representing updating times of key information corresponding to the key-value information.

Accordingly, for the writing module, according to the updating times, the average updating times, and the minimum updating times, determining the heat value level of the key-value information, and determining the second storage partition matched with the heat value level from the plurality of storage partitions specifically comprises: in response to the updating times being greater than the average updating times, determining the heat value level of the key-value information as a first heat level, and determining the first heat level storage partition from the plurality of storage partitions as the second storage partition; in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

In the third aspect, according to one or more embodiments of the present disclosure, an electronic device is provided, and the electronic device includes: a processor and a memory in communication connection with the processor; the memory stores computer-executable instructions; and the computer-executable instructions, when executed by the processor, cause the processor to implement the information processing method according to the first aspect and various possible designs of the first aspect described above.

In the fourth aspect, according to one or more embodiments of the present disclosure, a computer-readable storage medium is provided, the computer-readable storage medium stores computer-executable instructions, and the computer-executable instructions, when executed by a processor, cause the processor to implement the information processing method according to the first aspect and various possible designs of the first aspect described above.

In the fifth aspect, according to one or more embodiments of the present disclosure, a computer program product is provided, the computer program product includes a computer program, and the computer program, when executed by a processor, causes the processor to implement the information processing method according to the first aspect and various possible designs of the first aspect described above.

The foregoing are merely descriptions of the preferred embodiments of the present disclosure and the explanations of the technical principles involved. It should be understood by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method actions, it should be understood that the subject matter defined in the appended claims is not necessarily limited to the particular features and actions described above. Rather, the particular features and actions described above are merely exemplary forms for implementing the claims.

The invention claimed is:

1. An information processing method, applied to a key-value storage system for key-value separation, wherein a storage unit in the key-value storage system comprises a key partition and a plurality of storage partitions, the key partition is used for storing log-structured merge tree (LSMT) information, the plurality of storage partitions are used for storing key-value information, and the method comprises:

selecting, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;

detecting validity information corresponding to each key-value information in the target storage partition, and screening out valid key-value information from multiple key-value information stored in the target storage partition according to the validity information corresponding to each key-value information, wherein the validity information comprises being valid or being invalid; and transferring and storing the valid key-value information to a first storage partition except for the target storage partition, and erasing the multiple key-value information stored in the target storage partition.

2. The method according to claim 1, wherein the LSMT information comprises multiple index information, the index information comprises key information and storage location information of key-value information corresponding to the key information, and selecting, according to the LSMT information in the key partition, the target storage partition with the highest invalid information rate from the plurality of storage partitions comprised in the storage unit comprises:

in response to performing compression processing on the multiple index information comprised in the LSMT information, recording deleted key information in the multiple index information to obtain statistical information;

for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

3. The method according to claim 1, wherein the LSMT information comprises multiple index information, the index information comprises key information and storage location information of key-value information corresponding to the key information, and detecting the validity information corresponding to each key-value information in the target storage partition comprises:

for each key-value information, determining key information corresponding to the key-value information, wherein the key information comprises a key and a key identifier, and the key identifier is used for representing a version corresponding to the key;

determining, according to the key in the key information, a latest version of the key identifier corresponding to the key from the multiple index information, and determining whether the key identifier in the key information is identical to the latest version of the key identifier;

in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

4. The method according to claim 3, wherein types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and before determining, according to the key in the key information, the latest version of the key identifier corresponding to the key from the multiple index information, the method further comprises:

determining a type of the target storage partition;

when the type of the target storage partition is the first heat level storage partition or the second heat level storage partition, determining whether the key identifier in the key information is the latest version of the key identifier in the target storage partition, determining that the validity information corresponding to the key-value information is valid in response to the key identifier in the key information being the latest version of the key identifier in the target storage partition, and determining that the validity information corresponding to the key-value information is invalid in response to the key identifier in the key information not the latest version of the key identifier in the target storage partition; and when the type of the target storage partition is the third heat level storage partition, determining, according to the key in the key information, the latest version of the key identifier corresponding to the key from the multiple index information.

5. The method according to claim 4, wherein transferring and storing the valid key-value information to the first storage partition except for the target storage partition comprises:

determining the first storage partition with a same type as the target storage partition from the plurality of storage partitions except for the target storage partition; and transferring and storing the valid key-value information to the first storage partition.

6. The method according to claim 1, wherein the LSMT information comprises multiple index information, and after transferring and storing the valid key-value information to the first storage partition except for the target storage partition, the method further comprises:

for each valid key-value information, acquiring target index information corresponding to the valid key-value information from the multiple index information; and determining migration path information of the valid key-value information transferred from the target storage partition to the first storage partition, and adding the migration path information to the target index information to obtain new index information corresponding to the valid key-value information.

7. The method according to claim 1, wherein the key-value storage system further comprises heat set information, the heat set information comprises average updating times of key information and updating times of key information corresponding to each index information, and the method further comprises:

in response to receiving key-value information to be written, acquiring, from the heat set information, updating times corresponding to key information in the key-value information, minimum updating times of key information in the heat set information, and average updating times of key information in the heat set information;

according to the updating times, the average updating times, and the minimum updating times, determining a heat value level of the key-value information, and determining a second storage partition matched with the heat value level from the plurality of storage partitions; and storing the key-value information into the second storage partition.

8. The method according to claim 7, wherein types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and according to the updating times, the average updating times, and the minimum updating times, determining the heat value level of the key-value information, and determining the second storage partition matched with the heat value level from the plurality of storage partitions comprises:

in response to the updating times being greater than the average updating times, determining the heat value level of the key-value information as a first heat level, and determining the first heat level storage partition from the plurality of storage partitions as the second storage partition;

in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

9. An electronic device, comprising: a processor and a memory in communication connection with the processor, wherein the memory stores computer-executable instructions, and the computer-executable instructions, when executed by the processor, cause the processor to implement an information processing method applied to a key-value storage system for key-value separation, wherein a storage unit in the key-value storage system comprises a key partition and a plurality of storage partitions, the key partition is used for storing log-structured merge tree (LSMT) information, the plurality of storage partitions are used for storing key-value information, and the method comprises:

selecting, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;

detecting validity information corresponding to each key-value information in the target storage partition, and screening out valid key-value information from multiple key-value information stored in the target storage partition according to the validity information corresponding to each key-value information, wherein the validity information comprises being valid or being invalid; and transferring and storing the valid key-value information to a first storage partition except for the target storage partition, and erasing the multiple key-value information stored in the target storage partition.

10. The electronic device according to claim 9, wherein the LSMT information comprises multiple index information, the index information comprises key information and storage location information of key-value information corresponding to the key information, and selecting, according to the LSMT information in the key partition, the target storage partition with the highest invalid information rate from the plurality of storage partitions comprised in the storage unit comprises:

in response to performing compression processing on the multiple index information comprised in the LSMT information, recording deleted key information in the multiple index information to obtain statistical information;

for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

11. The electronic device according to claim 9, wherein the LSMT information comprises multiple index information, the index information comprises key information and storage location information of key-value information corresponding to the key information, and detecting the validity information corresponding to each key-value information in the target storage partition comprises:

for each key-value information, determining key information corresponding to the key-value information, wherein the key information comprises a key and a key identifier, and the key identifier is used for representing a version corresponding to the key;

determining, according to the key in the key information, a latest version of the key identifier corresponding to the key from the multiple index information, and determining whether the key identifier in the key information is identical to the latest version of the key identifier;

in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

12. The electronic device according to claim 11, wherein types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and before determining, according to the key in the key information, the latest version of the key identifier corresponding to the key from the multiple index information, the method further comprises:

determining a type of the target storage partition;

when the type of the target storage partition is the first heat level storage partition or the second heat level storage partition, determining whether the key identifier in the key information is the latest version of the key identifier in the target storage partition, determining that the validity information corresponding to the key-value information is valid in response to the key identifier in the key information being the latest version of the key identifier in the target storage partition, and determining that the validity information corresponding to the key-value information is invalid in response to the key identifier in the key information not the latest version of the key identifier in the target storage partition; and when the type of the target storage partition is the third heat level storage partition, determining, according to the key in the key information, the latest version of the key identifier corresponding to the key from the multiple index information.

13. The electronic device according to claim 12, wherein transferring and storing the valid key-value information to the first storage partition except for the target storage partition comprises:

determining the first storage partition with a same type as the target storage partition from the plurality of storage partitions except for the target storage partition; and transferring and storing the valid key-value information to the first storage partition.

14. The electronic device according to claim 9, wherein the LSMT information comprises multiple index information, and after transferring and storing the valid key-value information to the first storage partition except for the target storage partition, the method further comprises:

for each valid key-value information, acquiring target index information corresponding to the valid key-value information from the multiple index information; and determining migration path information of the valid key-value information transferred from the target storage partition to the first storage partition, and adding the migration path information to the target index information to obtain new index information corresponding to the valid key-value information.

15. The electronic device according to claim 9, wherein the key-value storage system further comprises heat set information, the heat set information comprises average updating times of key information and updating times of key information corresponding to each index information, and the method further comprises:

in response to receiving key-value information to be written, acquiring, from the heat set information, updating times corresponding to key information in the key-value information, minimum updating times of key information in the heat set information, and average updating times of key information in the heat set information;

according to the updating times, the average updating times, and the minimum updating times, determining a heat value level of the key-value information, and determining a second storage partition matched with the heat value level from the plurality of storage partitions; and storing the key-value information into the second storage partition.

16. The electronic device according to claim 15, wherein types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and according to the updating times, the average updating times, and the minimum updating times, determining the heat value level of the key-value information, and determining the second storage partition matched with the heat value level from the plurality of storage partitions comprises:

in response to the updating times being greater than the average updating times, determining the heat value level of the key-value information as a first heat level, and determining the first heat level storage partition from the plurality of storage partitions as the second storage partition;

in response to the updating times being less than or equal to the average updating times and greater than the minimum updating times, determining the heat value level of the key-value information as a second heat level, and determining the second heat level storage partition from the plurality of storage partitions as the second storage partition; and in response to the updating times being less than or equal to the minimum updating times, determining the heat value level of the key-value information as a third heat level, and determining the third heat level storage partition from the plurality of storage partitions as the second storage partition.

17. A computer-readable storage medium, wherein computer-executable instructions are stored on the computer-readable storage medium, and the computer-executable instructions, when executed by a processor, cause the processor to implement an information processing method applied to a key-value storage system for key-value separation, wherein a storage unit in the key-value storage system comprises a key partition and a plurality of storage partitions, the key partition is used for storing log-structured merge tree (LSMT) information, the plurality of storage partitions are used for storing key-value information, and the method comprises:

selecting, according to the LSMT information in the key partition, a target storage partition with a highest invalid information rate from the plurality of storage partitions comprised in the storage unit, wherein the invalid information rate is used for representing a proportion of invalid key-value information to total key-value information in the storage partition;

detecting validity information corresponding to each key-value information in the target storage partition, and screening out valid key-value information from multiple key-value information stored in the target storage partition according to the validity information corresponding to each key-value information, wherein the validity information comprises being valid or being invalid; and transferring and storing the valid key-value information to a first storage partition except for the target storage partition, and erasing the multiple key-value information stored in the target storage partition.

18. The computer-readable storage medium according to claim 17, wherein the LSMT information comprises multiple index information, the index information comprises key information and storage location information of key-value information corresponding to the key information, and selecting, according to the LSMT information in the key partition, the target storage partition with the highest invalid information rate from the plurality of storage partitions comprised in the storage unit comprises:

in response to performing compression processing on the multiple index information comprised in the LSMT information, recording deleted key information in the multiple index information to obtain statistical information;

for each storage partition in the storage unit, determining number of invalid key-value information in the storage partition according to the statistical information, wherein the invalid key-value information is key-value information corresponding to the deleted key information; and taking a ratio of the number of the invalid key-value information in the storage partition to a total number of key-value information stored in the storage partition as the invalid information rate of the storage partition, and selecting the target storage partition with the highest invalid information rate from the plurality of storage partitions.

19. The computer-readable storage medium according to claim 17, wherein the LSMT information comprises multiple index information, the index information comprises key information and storage location information of key-value information corresponding to the key information, and detecting the validity information corresponding to each key-value information in the target storage partition comprises:

for each key-value information, determining key information corresponding to the key-value information, wherein the key information comprises a key and a key identifier, and the key identifier is used for representing a version corresponding to the key;

determining, according to the key in the key information, a latest version of the key identifier corresponding to the key from the multiple index information, and determining whether the key identifier in the key information is identical to the latest version of the key identifier;

in response to the key identifier in the key information being identical to the latest version of the key identifier, determining that validity information corresponding to the key-value information is valid; and in response to the key identifier in the key information being different from the latest version of the key identifier, determining that validity information corresponding to the key-value information is invalid.

20. The computer-readable storage medium according to claim 19, wherein types of the storage partitions comprise a first heat level storage partition, a second heat level storage partition, and a third heat level storage partition, a heat value of key-value information stored in the first heat level storage partition is greater than a heat value of key-value information stored in the second heat level storage partition, the heat value of the key-value information stored in the second heat level storage partition is greater than a heat value of key-value information stored in the third heat level storage partition, the heat value is used for representing updating times of key information corresponding to the key-value information, and before determining, according to the key in the key information, the latest version of the key identifier corresponding to the key from the multiple index information, the method further comprises:

determining a type of the target storage partition;

when the type of the target storage partition is the first heat level storage partition or the second heat level storage partition, determining whether the key identifier in the key information is the latest version of the key identifier in the target storage partition, determining that the validity information corresponding to the key-value information is valid in response to the key identifier in the key information being the latest version of the key identifier in the target storage partition, and determining that the validity information corresponding to the key-value information is invalid in response to the key identifier in the key information not the latest version of the key identifier in the target storage partition; and when the type of the target storage partition is the third heat level storage partition, determining, according to the key in the key information, the latest version of the key identifier corresponding to the key from the multiple index information.

* * * * *